United States Patent
Hatton et al.

(10) Patent No.: US 11,538,323 B2
(45) Date of Patent: Dec. 27, 2022

(54) TELEMATICS SYSTEM FOR PREVENTING COLLISIONS AND IMPROVING WORKSITE SAFETY

(71) Applicant: Gary Hatton, Danville, CA (US)

(72) Inventors: Gary Hatton, Danville, CA (US); Gustavo Anzola, Cumming, GA (US); Kramer Nance, Chicago, IL (US)

(73) Assignee: Gary Hatton, Danville, CA (US)

( * ) Notice: Subject to any disclaimer, the term of this patent is extended or adjusted under 35 U.S.C. 154(b) by 0 days.

(21) Appl. No.: 17/725,965

(22) Filed: Apr. 21, 2022

(65) Prior Publication Data

US 2022/0351596 A1 Nov. 3, 2022

Related U.S. Application Data

(60) Provisional application No. 63/180,787, filed on Apr. 28, 2021.

(51) Int. Cl.
*G08B 21/02* (2006.01)
*H04W 4/38* (2018.01)
*H04W 4/021* (2018.01)

(52) U.S. Cl.
CPC ............ *G08B 21/02* (2013.01); *H04W 4/021* (2013.01); *H04W 4/38* (2018.02)

(58) Field of Classification Search
None
See application file for complete search history.

(56) References Cited

U.S. PATENT DOCUMENTS

| 9,365,155 | B2 | 6/2016 | Hathaway et al. |
| 9,738,222 | B2 | 8/2017 | Hathaway et al. |
| 10,046,699 | B2 | 8/2018 | Hathaway et al. |
| 10,384,604 | B2 | 8/2019 | Hathaway et al. |
| 10,953,796 | B2 | 3/2021 | Hathaway et al. |
| 11,113,942 | B1 * | 9/2021 | Wade ................. G08B 21/0453 |
| 2019/0133239 | A1 * | 5/2019 | Albalawi ................. A42B 3/30 |
| 2021/0295460 | A1 * | 9/2021 | Tamazato ........... G06Q 10/0635 |

* cited by examiner

*Primary Examiner* — Thomas S McCormack
(74) *Attorney, Agent, or Firm* — Lucas R Yordy; Jacob W Neu; Bradley Arant Boult Cummings LLP (57) ABSTRACT

A telematics system and method for monitoring objects in a space having a worker and a lifting apparatus or piece of equipment is described. The telematics system may comprise a base station in communication with a plurality of portable units. The portable units may comprise a position sensor and may secure to a lifting apparatus, worker, or other person or equipment. The portable units may communicate the location of the lifting apparatus, worker, or other person or equipment to the base station. The base station may compare or dynamically generate a safety zone around the locations of the lifting apparatus, worker, or other person or equipment to the base station. The base station may issue an alert if a lifting apparatus, worker, or other person or equipment comes within a predetermined distance of or within the safety zone around a different lifting apparatus, worker, or other person or equipment.

16 Claims, 7 Drawing Sheets

TELEMATICS SYSTEM FOR PREVENTING COLLISIONS AND IMPROVING WORKSITE SAFETY

CROSS REFERENCE TO OTHER APPLICATIONS

This application claims the benefit of the filing of U.S. Provisional Patent Application No. 63/180,787 filed on Apr. 28, 2021, which is incorporated by reference herein.

TECHNICAL FIELD

The present invention relates to telematics systems that may be used to prevent collisions or accidents from occurring between several monitored objects or persons. Particularly, the invention relates to a telematics system for monitoring persons and machinery or objects in a worksite and issuing alerts to workers if a risk of a collision or accident is identified.

BACKGROUND OF THE INVENTION

Approximately 150,000 injuries occur at construction sites every year. Construction sites are hazardous in part due to heavy machinery being operated and construction materials or debris being lifted and moved in close proximity to workers. In particular, over 60% of deaths at construction sites are due to falling objects. Traditional safety measures used to prevent accidents and collisions at work sites include the use of passive tools such as helmets and bright vests. Other safety measures include procedural tools such as blocking off areas around hazardous activities.

Currently, construction sites employ some active safety measures that detect impending accidents or collisions and implement preventative measures. Many current safety systems work by using radar or similar technologies to detect the presence of an object in a designated area and then issue an alert to those in the area using a loudspeaker or flashing light. However, these systems have several disadvantages. First, they can only detect hazards within a selected area. This is unideal for worksites where the shape and hazardous areas of the worksite are constantly changing. Second, the radar or other detection methods used by these systems are limited in their ability to differentiate between different object in the area. For example, the systems may issue the same alert when a worker moves into an area as they would when a piece of machinery moves into the area. This may cause alerts to be issued even when no hazard exists. Third, these systems issue broad alerts to those around the system and not just to workers in proximity of the hazard. This may result in unnecessary work interruptions and workers coming to ignore alerts.

What is needed then is an automated telematics system for detecting impending accidents or collisions within a worksite that is scalable and adaptable to growing and changing worksites, discerns between hazardous and nonhazardous situations, and issues individualized alerts to relevant workers.

SUMMARY OF THE INVENTION

In some respects, the disclosure is directed to a method of monitoring objects in a space having a lifting apparatus and a worker, having the steps of providing a telematics system comprising a base station; securing a first portable unit to the lifting apparatus, the first portable unit configurable to allow the telematics system to determine the location of the lifting apparatus; securing a second portable unit to the worker, the second portable unit configurable to allow the telematics system to determine the location of the worker; communicating the locations of the worker and the lifting apparatus from the first and second portable units to the base station; comparing the locations of the worker and the lifting apparatus; and issuing an alert to the worker if the worker and the lifting apparatus come within a predetermined distance of each other.

In other respects, the disclosure is directed to a method of monitoring objects in a space having a piece of equipment and a worker, having steps of providing a telematics system comprising a base station; securing a first portable unit to the worker, the first portable unit configurable to allow the telematics system to determine the location of the worker; securing a second portable unit to the piece of equipment, the second portable unit configurable to allow the telematics system to determine the location of the piece of equipment; communicating the locations of the worker and the piece of equipment from the first and second portable units to the base station; comparing the locations of the worker and the piece of equipment; and issuing an alert to the worker if the worker and the piece of equipment come within a predetermined distance of each other.

In other respects, the disclosure is directed to a telematics system for monitoring objects in a space having a piece of equipment and a worker, having a base station comprising a position sensor for determining the location of the base station and a plurality of portable units communicably connected to the base station, each portable unit comprising a position sensor, wherein a portable unit is configured to secure to the piece of equipment, to allow the telematics system to determine the location of the piece of equipment using the position sensor, and to transmit the location of the piece of equipment to the base station, wherein a portable unit is configured to secure to the worker, to allow the telematics system to determine the location of the worker using the position sensor, and to transmit the location of the worker to the base station, and wherein the base station is configured to receive the locations of the piece of equipment and the worker, compare the piece of equipment and the worker, and issue an alert if the piece of equipment and the worker come within a predetermined distance of each other.

These features and advantages of the present disclosure will become more fully apparent from the following description and appended claims or may be learned by the practice of the disclosure as set forth hereinafter.

BRIEF DESCRIPTION OF THE DRAWINGS

FIG. 5 depicts an exemplary work site employing one embodiment of a telematics system in accordance with the present disclosure. In FIG. 5, the work site includes a lifting apparatus lifting an active load.

FIG. 6 depicts another exemplary work site employing one embodiment of a telematics system in accordance with the present disclosure. In FIG. 6, the work site includes equipment in motion.

DETAILED DESCRIPTION

Disclosed herein is a telematics system 10 for preventing collisions or other accidents from occurring at a worksite. Generally, the telematics system 10 operates by monitoring the location of persons, equipment, and other objects on a work site and issuing an alert if there is an impending collision to allow preventative measures to be taken. The telematics system and its components as well as methods of using the telematics system are discussed below.

System and System Components

Figure 1:
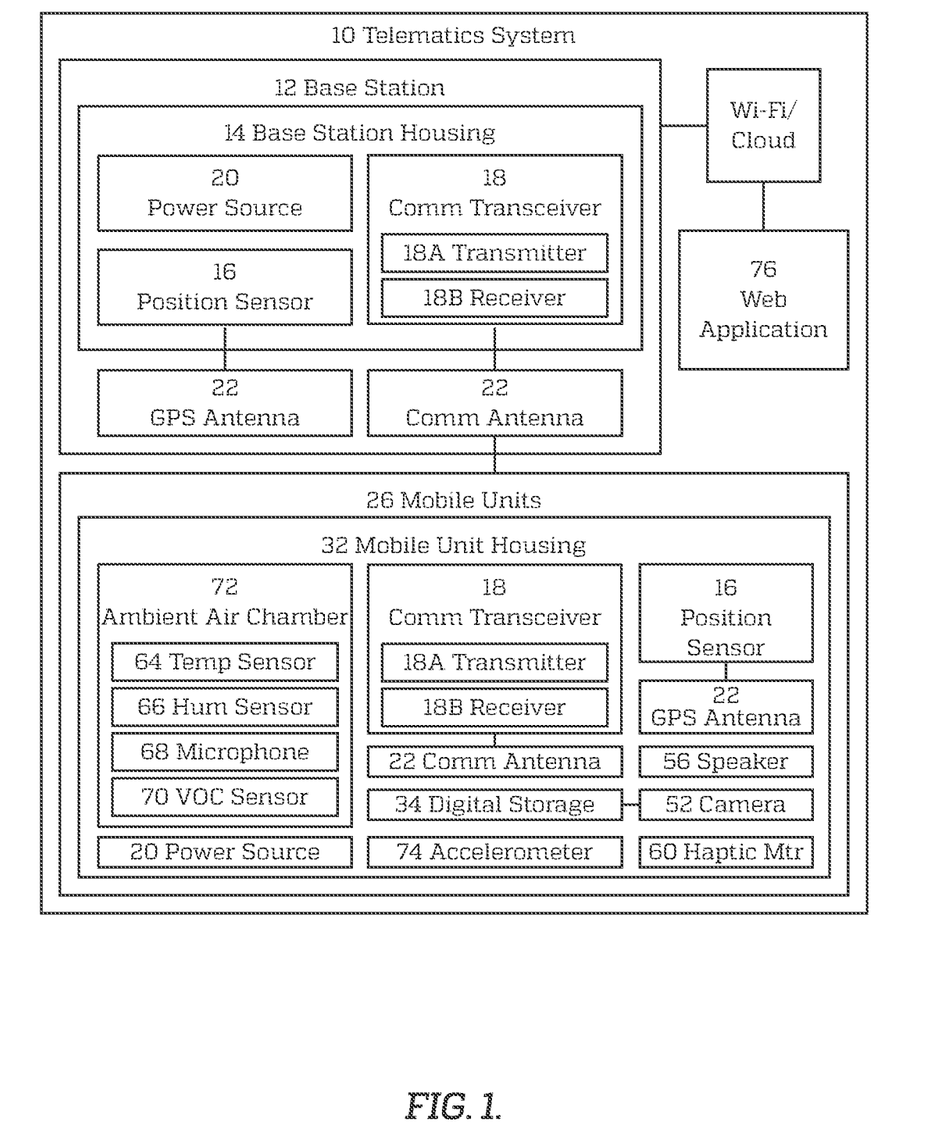
FIG. 1 is a block diagram illustrating one embodiment of a telematics system in accordance with the present disclosure.
Figure 2:
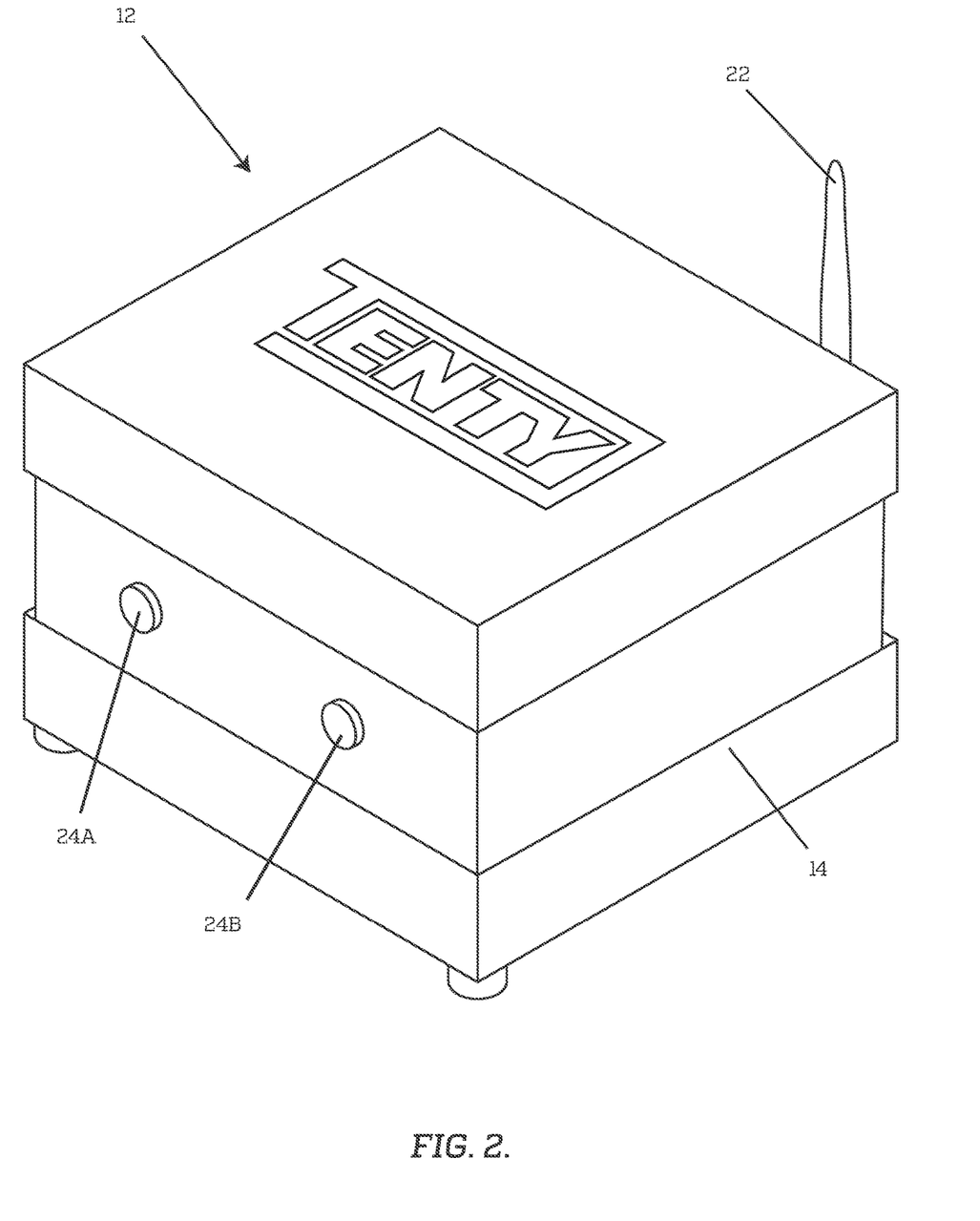
FIG. 2 is a front top perspective view of one embodiment of a base station of a telematics system in accordance with the present disclosure.
Figure 3:
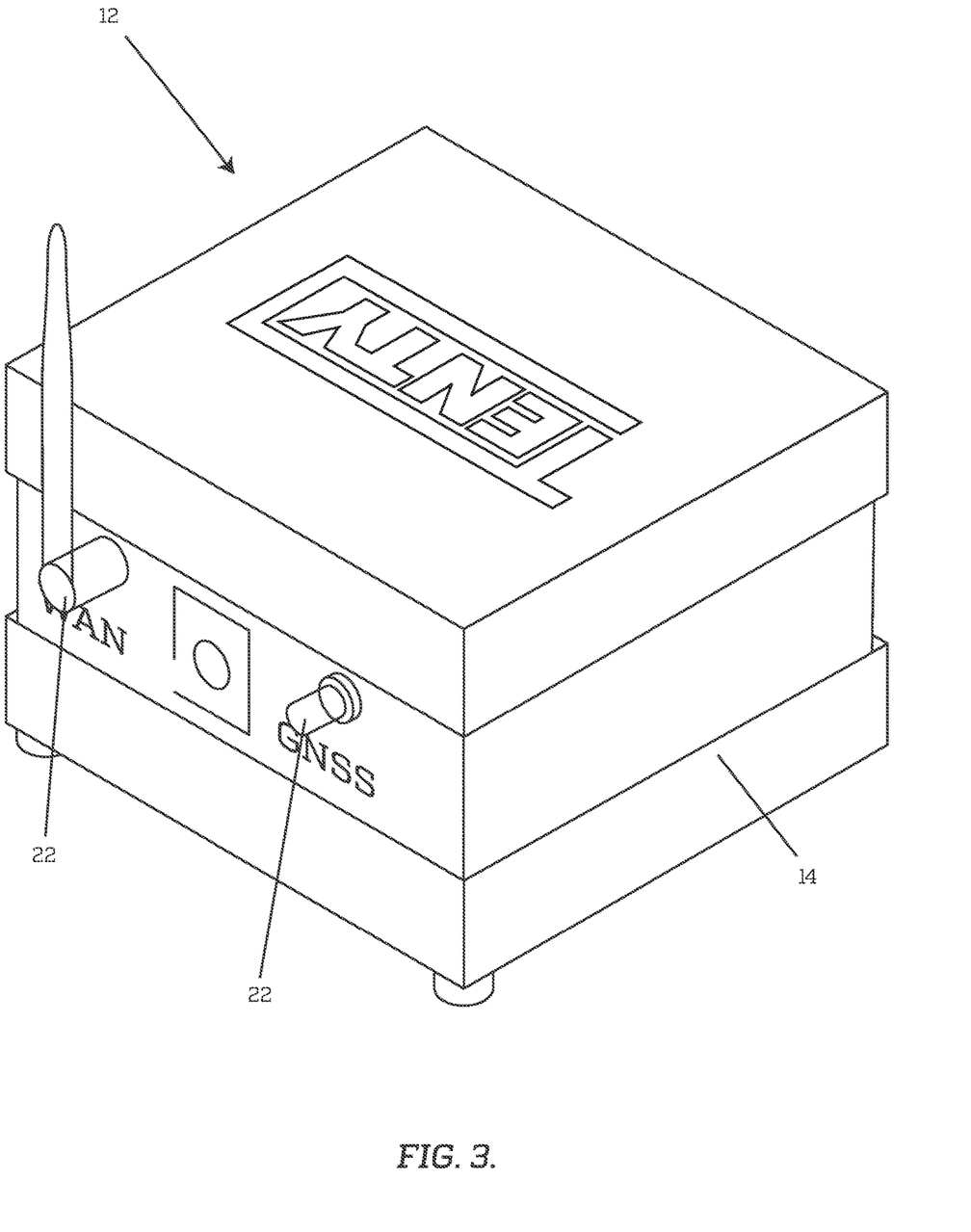
FIG. 3 is a rear top perspective view of the base station of FIG. 2.

FIG. 1 is a block diagram showing one embodiment of the telematics system disclosed. The telematics system 10 comprises a base station 12 for receiving communications and transmitting communications to and from other devices in the telematics system 10 and analyzing the location of monitored persons or other objects on the worksite. As shown in FIGS. 2-3, the base station 12 may comprise a housing 14 enclosing and protecting the other components of the base station 12. Optionally, the base station 12 or base station housing 14, if present, is less than 2500 cubic centimeters. The base station 12 may comprise a position sensor 16, a communication transceiver 18, and a power source 20.

The position sensor 16 of the base station 12 generates location data for the base station 12. As used here and throughout this specification, location data may include latitudinal, longitudinal, and/or elevation data and may be in the form of a two-dimensional or three-dimensional location. The base station 12 may be disposed indoors or outdoors. Preferably, the base station 12 is in a fixed location during use. In some embodiments, the base station 12 may be disposed in or on mobile equipment such as an office trailer that may be transported between different work sites. The positions sensors 16 are discussed in greater detail below.

Figure 5:
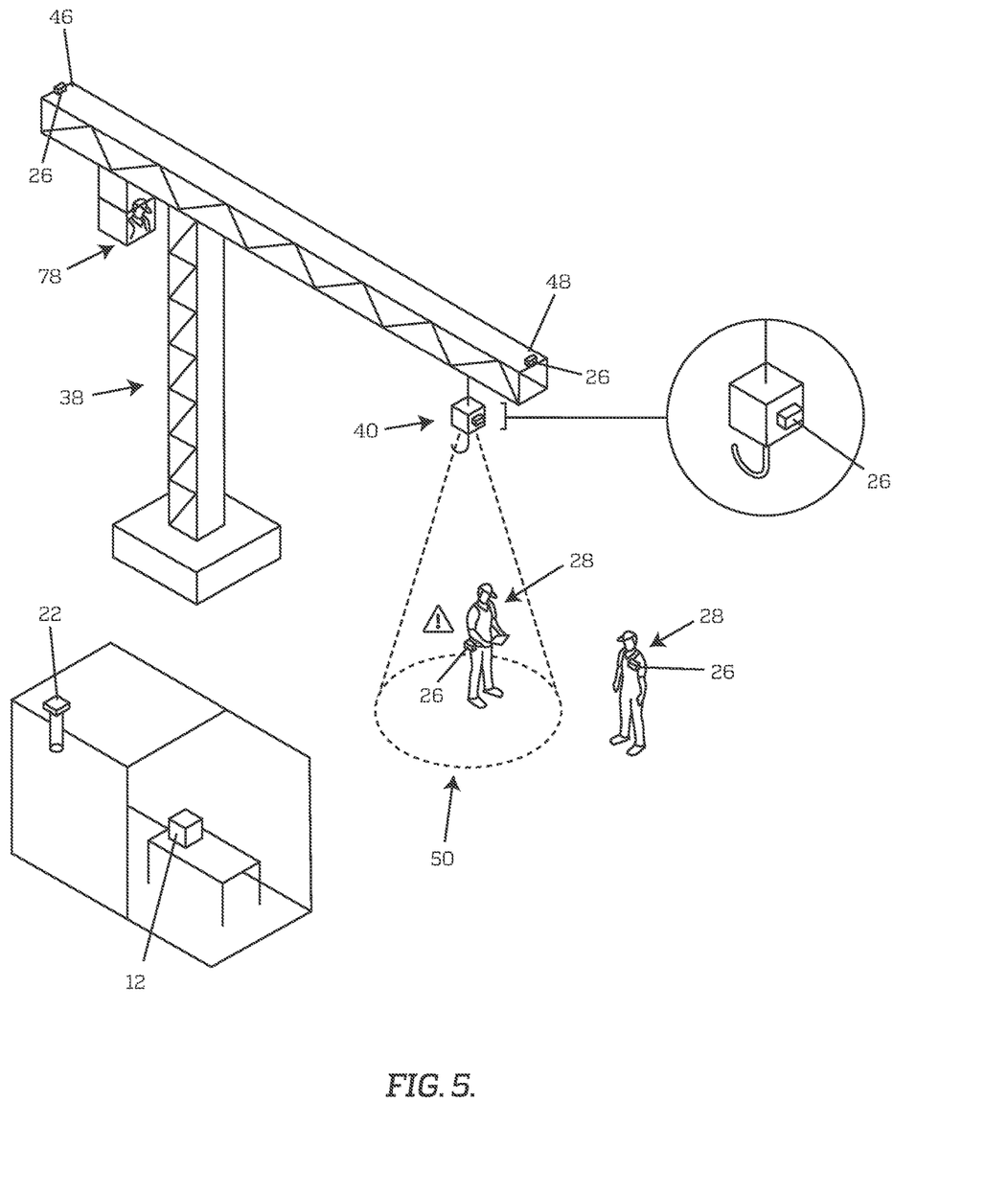
Figure 6:
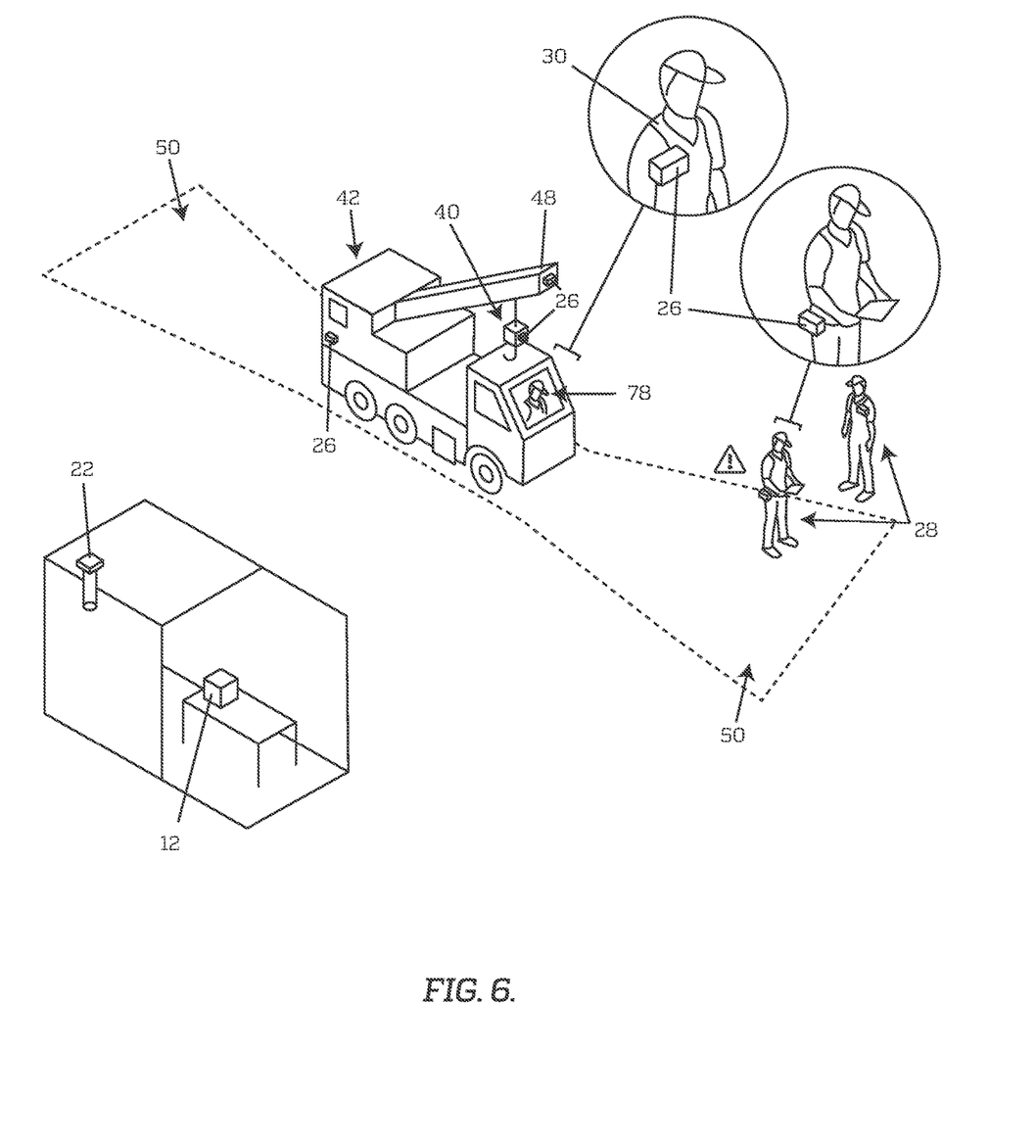

The communication transceiver 18 of the base station 12 allows the base station to transmit or receive communications or other data to and from other devices in the telematics system 10. The communication transceiver 18 of the base station 12 may comprise a transmitter 18A and a receiver 18B that are discrete components. Optionally, the base station 12 further comprises an antenna 22 communicably connected to the base station 12 as shown in FIGS. 2-3. In some embodiments, it may be desirable for the antenna 22 to be disposed outdoors and/or with an unobstructed view of the sky regardless of whether the base station 12 is located indoors, as shown in FIGS. 5-6, or outdoors.

The base station 12 and other devices in the telematics system 10 may be communicably connected through a wide area network (WAN). In some embodiments, the base station 12 is a coordinator of the WAN. The base station 12 may also be a local access point for local Wi-Fi communication. The base station 12 may also comprise a web server. The telematics system 10 may also employ other known telecommunications technologies that are known in the art or later developed to allow for communication between the base station 12 and other devices in the telematics system.

The base station 12 may comprise one or more status lights 24 for communicating the status of the base station 12 to an observer. The status lights 24 may be LED lights and, in some embodiments, can display multiple colors or patterns. For example, the base station 12 may comprise two status lights 24: a red status light 24A and a green status light 24B. The status lights 24 may blink or display other patterns to communicate a particular message. For example, the base station 12 red status light 24A may display a first pattern when the base station 12 is off and may display a second pattern when the base station 12 has a fault. As another example, the base station 12 green status light 24B may display a first pattern when the base station 12 is initializing and may display a second pattern when the base station 12 is fully operational. In the context of status lights 24, a pattern as used here and throughout this specification may include the display of a particular color and/or a particular pattern of blinking including the light being completely off or the light displaying a solid (non-blinking) pattern.

Figure 4:
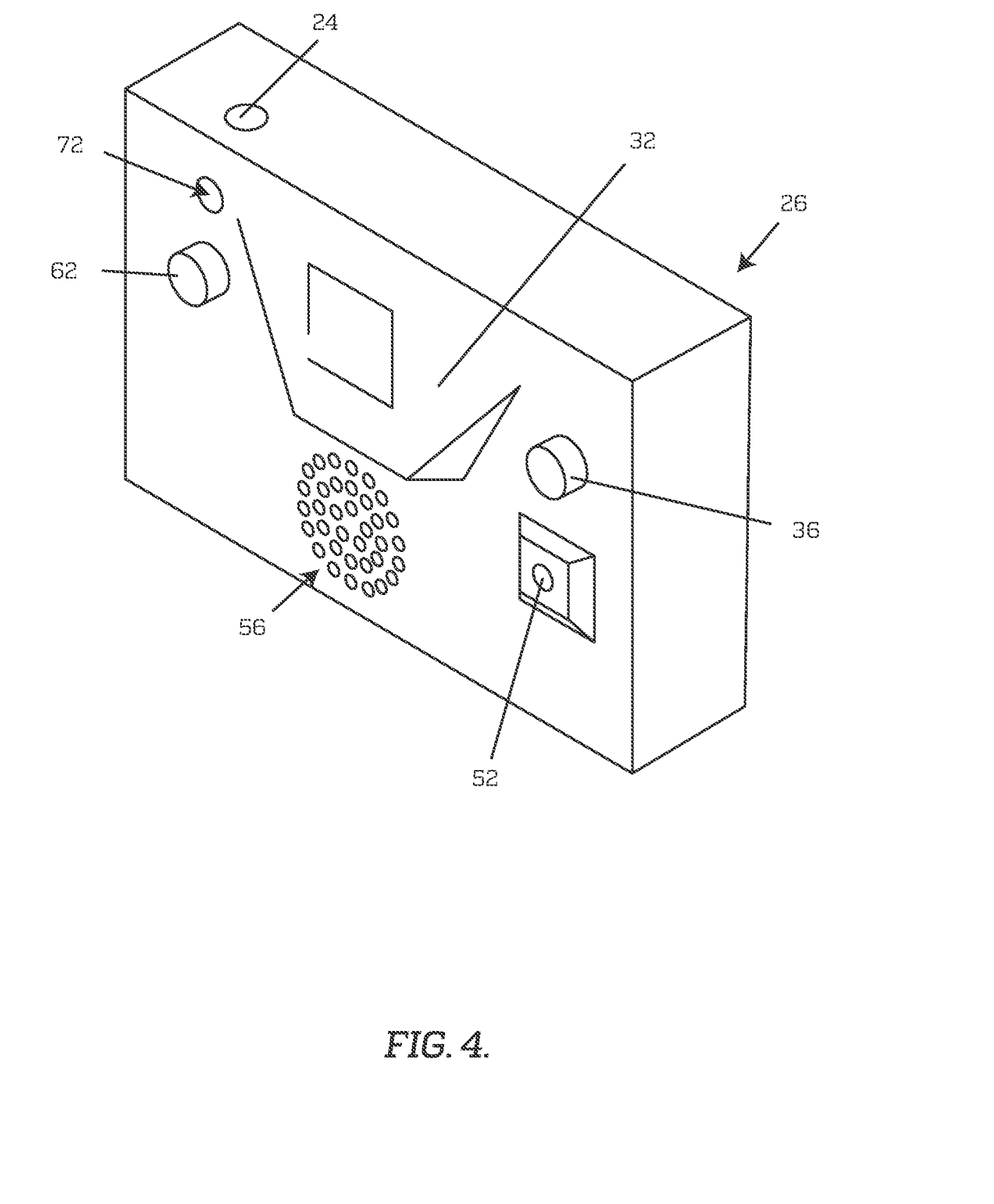
FIG. 4 is a front top perspective view of one embodiment of a portable unit of a telematics system in accordance with the present disclosure.

The telematics system 10 also comprises a plurality of portable units 26 for monitoring the location of persons, equipment, or other objects on a worksite and communicating the location to the base station 12. An illustration of a portable unit is shown in FIG. 4. The portable units 26 may be configured to work indoors or outdoors. Generally, at least one portable unit 26 of the telematics system 10 is a wearable device worn by a worker 28. As shown in FIGS. 5-6, the portable unit 26 may be configured to strap to a worker's 28 arm or wrist, fit in a pocket, attach to a vest 30, strap to a hard hat, or secure to any other convenient location on a worker 28. Each portable unit 26 may also comprise a housing 32. In some embodiments, the portable unit housing 32 may be waterproof or meet the standards for an Ingress Protection (IP) rating of 54 or greater.

A portable unit 26 may comprise a position sensor 16 to generate location data for the portable unit 26. The position sensor 16 may communicate through an attached antenna 22 connected to an antenna 22, or more particularly a GNSS antenna 22, disposed inside the portable unit's housing 32. A portable unit may also be a router in a WAN and communicate with the base station through the WAN. The position sensor 16 of the portable unit 26 is discussed in more detail below.

A portable unit 26 may further comprise a communication transceiver 18 for sending and receiving communications or other data or information to and from other devices in the telematics system 10. For example, the communication transceiver 18 of a portable unit 26 may receive information from or transmit information to the communication transceiver 18 of the base station 12. The communication transceiver 18 of the portable unit 26 may comprise a transmitter 18A and a receiver 18B that are discrete components.

A portable unit 26 may comprise a power source 20 for powering the portable unit 26. The power source 20 for a portable unit 26 may be a battery. In some embodiments, the battery is rechargeable. A portable unit 26 may communicate the remaining battery life of the portable unit 26 to the base station 12. Further, the telematics system 10 may alert a supervisor, system manager, or other worker 28 when the battery is low. The alert issued for a low battery may be similar to other alerts issued to or from the portable units 26 as discussed in greater detail below.

The portable units 26 may comprise a digital storage medium 34 for storing photos, videos, time-lapse videos, location data, temperature data, humidity data, accelerometer data, or other data. The digital storage medium 34 may be a Micro-SD card or other devices or technologies used to store electronic content such as programs and data. Optionally, a worker 28 may access data on the digital storage medium 34 by accessing the digital storage medium 34 directly or through a web application, discussed below, and extracting the desired data. A portable unit 26 may also transmit data to the base station 12 periodically or in response to a request received from the base station 12.

A portable unit 26 may comprise one or more status lights 24 for communicating the status of the portable unit 26 to a worker 28. Preferably, the status lights 24 on the portable units 26 are LEDs and, in some embodiments, can display multiple colors or patterns. For example, a status light 24 on a portable unit 26 may display: a first pattern when the portable unit 26 is off; a second pattern when the portable unit 26 has a fault; a third pattern when the portable unit 26 is initializing; a fourth pattern when the portable unit 26 is ready/online and is indoors; and/or a fifth pattern when the portable unit 26 is ready/online and is outdoors. The status lights 24 may also flash or display another pattern to visually alert a worker 28 of a hazard. Among other benefits, a visual alert may be desirable to alert a worker 28 to a hazard on noisy job sites where a worker 28 may not hear an audible alert.

Further, a portable unit 26 may comprise an emergency switch 36 for communicating to others that a worker 28 is in need of assistance. The emergency switch 36 may be in the form of a pushbutton. Typically, a worker 28 will operate the emergency switch 36 when a collision, an accident, or other situation occurs where a worker 28 needs assistance. The portable unit 26 of the worker 28 in need of assistance may send an alert and/or location data to the base station 12 or other devices in the telematics system 10 or to managers, supervisors, foreman, or other workers 28 to notify others of the emergency when the worker 28 in need of assistance operates the emergency switch 36 on a portable unit 26.

The portable units 26 may have a plurality of modes that change how the portable unit 26 operates in different situations. The plurality of modes may include a worker mode, a lifting mode, or an equipment mode. A portable unit 26 secured to a worker 28 may be set to worker mode. A portable unit 26 secured to a lifting apparatus 38, such as a crane, or load point 40 of the lifting apparatus 38, such as the hook block on a crane, may be set to lifting mode. A portable unit 26 secured to a piece of equipment 42, such as a vehicle, may be set to equipment mode. A portable unit 26 may further comprise a selector (not shown) to change the mode of the portable unit 26. The selector may be disposed internally to the portable unit 26. The selector may be in the form of a dip switch or a selector switch. Alternatively, a portable unit 26 may be set to a single mode (e.g., worker mode). In such embodiments, the portable unit 26 may be designed with enhanced or additional functionality specific to that mode.

Optionally, a portable unit 26 communicates data about the mode that the portable unit 26 is into the base station 12. The base station 12 may then use the mode data to determine whether a portable unit 26 is attached to a worker 28, lifting apparatus 38, or other piece of equipment 42. The base station 12 may monitor a portable unit 26 differently or issue different alerts based on data from a portable unit 26 differently depending on the mode of a particular portable unit 26. How the telematics system 10 monitors the portable units 26 and issues alerts based on data from the portable units 26 is discussed in more detail below.

As shown in FIGS. 5-6, multiple portable units 26 may be paired together to allow the telematics system 10 to determine more complex information about a work site such as the orientation of a lifting apparatus 38 or piece of equipment 42. For example, a portable unit 26 in equipment mode may be attached to the base of a lifting apparatus 38, the rear 46 of the lifting apparatus 38, or the mast 48 of the lifting apparatus 38 and paired to a portable unit 26 in lift mode attached to the load point 40 of the lifting apparatus 38 or front of the boom of the lifting apparatus. The telematics system 10 may be able to determine the direction that a mast 48 of a lifting apparatus 38 moves, extends, or swings based on the relative locations of the two portable units 26. In another example, a portable unit 26 in equipment mode attached to one point on a piece of equipment 42, such as the front of a truck, may be paired with another portable unit 26 attached to the same piece of equipment 42 at a different location, such as the rear of a truck. The telematics system 10 may also determine the orientation of the piece of equipment 42. The telematics system 10 may then dynamically form a safety zone 50, discussed in greater detail below, in any suitable shape around the vectors formed between paired portable units 26 that are secured to the equipment 42 or other object on a work site.

As previously discussed, the base station 12 and portable units 26 may comprise position sensors 16. A position sensor 16 in the base station 12 and portable units 26 may be a Global Navigation Satellite System (GNSS) receiver. The position sensor 16 is connected to a GNSS antenna 22 disposed inside the portable units housing 32. In some embodiments, the position sensors 16 of the base station 12 or portable units 26 use Differential Global Positioning System (DGPS) and/or Real-Time Kinematic (RTK) positioning to determine the location of the base station 12 or a worker 28, lifting apparatus 38, or other equipment 42 having a portable unit 26 attached. DGPS or RTK positioning are generally considered to produce more precise and accurate location data than other positioning technologies and methods. Among other benefits, using more accurate positioning technologies or methods in the telematics system 10 helps ensure that alerts are issued only when a collision or other accident is likely to occur and prevent false alarms when a collision or other accident is not likely to occur.

Further, the base station 12 may generate location correction data and transmit the correction data to one or more portable units 26 to allow the portable units 26 to determine their locations more accurately. To generate the location correction data, the base station 12 may perform a self-survey upon start-up to determine its location or may determine its location using data from a previous self-survey. The base station 12 may then generate location correction data based on the location of the base station 12. The base station 12 may then communicate the location correction data to the portable units 26. Optionally, the base station 12 may communicate other configuration data to the portable units 26 in addition to or along with the location correction data.

Geolocation systems such as those discussed above may differ in how they determine location. However, geolocation systems are well-known in the art, and a person having ordinary skill in the art would know how to incorporate different geolocations systems into the telematics system 10 of the present disclosure. The determination of the location of a portable unit 26 need not be performed solely on the portable unit 26 but may be performed in combination with the base station 12, a processor on the base station 12, or other components of the telematics system 10.

The portable units 26 may use the location correction data to determine the location of a worker 28, lifting apparatus 38, or other equipment 42 prior to communicating the location data to the base station 12. The portable units 26 may calculate their corrected location using the location correction data by implementing a DGPS or RTK algorithm. Using the DGPS or RTK algorithm and the correction data from the base station 12, the portable units 26 may be capable of accurately determining their location within 1 cm.

One or more portable units 26 in the telematics system 10 may comprise a camera 52 for taking photos or recording videos. The camera 52 may take photos or record videos at regular time intervals. For example, the camera 52 may take pictures or record videos every 1, 2, 3, 5, 10, 15, 30, 60, 120, 180, or 300 seconds. In some embodiments, photos taken by the camera 52 may be converted into time-lapse videos. Photos or videos taken by the camera 52 may be recorded on the digital storage medium 34 in the portable unit 26. Photos or videos may also be transmitted to the base station 12 for review and storage.

Optionally, a portable unit 26 may further comprise a camera toggle switch for toggling the camera 52 on and off. In some embodiments, a worker 28 may manipulate the camera toggle switch to enable or disable the camera 52. Preferably, the camera toggle switch is a pushbutton. In some embodiment, the camera toggle switch may be the same switch as another switch on the portable unit 26. In such embodiment, the camera 52 may be toggled on and off by activating the camera toggle switch in a particular pattern. A worker may toggle the camera 52 on or off for privacy or to conserve battery life. The camera 52 may automatically re-enable after being disabled by the camera toggle switch for a designated time. For example, the camera 52 may re-enable in 3, 5, 10, 15, 20, 25, or 30 minutes after a worker 28 disables the camera 52.

Further, a portable unit 26 may comprise one or more status lights 24 for the camera 52 to communicate the status of the camera to a worker 28. The status light 24 for the camera 52 may be the same as the status light 24 used for the portable unit 26 generally. The status light 24 of the camera 52 may be an LED light and may display multiple colors or patterns. For example, the status light 24 of the camera 52 may display a first pattern when the camera 52 is off, display a second pattern when the camera 52 is enabled, and display a third pattern when the camera 52 is temporarily disabled.

A portable unit 26 may comprise a speaker 56 for auditory communication with a worker 28. For example, the speaker 56 may sound an auditory alarm to alert the worker 28 of a hazard when the portable unit 26 receives a signal from the base station 12 or other portable units 26. The volume of a speaker 56 on a portable unit 26 may be controlled remotely from the base station 12 or from the web application 76 discussed below. In some embodiments, the volume of a speaker 56 on a portable unit 26 will automatically adjust up or down based on the ambient noise levels around the portable unit 26. For example, the volume of the speaker 56 may become louder when there are high levels of ambient noise and may become quieter when there are low levels of ambient noise.

A portable unit 26 may further comprise a haptic motor 60 for kinetic communication with a worker 28. The haptic motor 60 may produce a vibration to alert a worker 28 to a hazard. Among other benefits, a vibration may be desirable to alert a worker 28 to a hazard on noisy job sites where a worker 28 may not hear an audible alert. The telematics system 10 may also issue alerts to managers, supervisors, foremen, or other workers 28 by text message, email, or other forms of digital communication.

In some embodiments, a portable unit 26 may comprise an acknowledgment switch 62 that a worker 28 may use to acknowledge an alert or message from managers, supervisors, foreman, and/or other workers 28. For example, the acknowledgment switch 62 may be a button that the worker 28 may press to acknowledge an alert. In some embodiments, the acknowledgment switch 62 is the same switch as the camera toggle switch 62, and a worker 28 can choose between acknowledging an alert and toggling the camera 52 by activating the combination camera toggle switch and acknowledgment switch 62 in a particular pattern.

A portable unit 26 may include several other types of sensors. For example, in some embodiments, the portable units 26 may comprise a temperature sensor 64 such as a thermocouple or thermometer to take temperature measurements. The portable units 26 may record the temperature measurements as temperature data and transmit the temperature data to the base station 12 or other devices in the telematics system 10.

Further, one or more portable units 26 may comprise a humidity sensor 66 for taking humidity measurements. The portable unit 26 may record the humidity measurements from the humidity sensor 66 as humidity data and transmit the humidity data to the base station 12 or other devices in the telematics system 10.

Moreover, one or more portable units 26 may comprise a microphone 68 to record audio data. The portable units 26 may record audio data using the microphone 68 and transmit the audio data to the base station 12 or other devices in the telematics system 10. When combined with the speaker 56, the microphone 68 may allow the portable units 26 to function as radios that permit one-way or two-way communication between a portable unit 26 and the base station 12 or between portable units 26.

A portable unit 26 may comprise a device for measuring volatile organic compounds ("VOCs") in the ambient air, referred to herein as a VOC sensor 70. The portable units 26 may take measurements of VOCs in the air using the VOC sensor 70. The portable units 26 may record the VOC measurements as VOC data and transmit the VOC data to the base station 12. The temperature sensor 64, humidity sensor 66, the microphone 68, and the VOC sensor 70 may be located inside an airtight ambient air chamber 72 within the housing 32 of the portable units 26. Among other benefits, placing the temperature sensor 64, humidity sensor 66, microphone 68, or VOC sensor 70 in the ambient air chamber 72 allows for air to circulate to the sensors when the portable unit housing 32 is watertight. In some embodiments, a hydrophobic membrane is disposed around the opening to the ambient air chamber 72 to allow air to pass into the ambient air chamber 72 while preventing water from entering the chamber 72.

Optionally, one or more of the portable units 26 may comprise an accelerometer 74 for measuring the movement of the portable unit. The portable units 26 may record movement measurements as movement data and transmit the movement data to the base station 12 or other devices in the telematics system 10.

In some embodiments, the telematics system may further comprise a web application 76. The web application 76 may have a dashboard or interface that allows a user to configure the telematics system 10. The web application 76 may be configured to be accessible by computers or mobile devices that are on-site or off-site. The web application 76 may be hosted on the webserver running on the base station 12 when the base station 12 is not connected to the internet and may be hosted on a cloud-based server when the base station 12 is connected to the internet. The web application 76 may be configured to complete a variety of different functions. For example, the web application 76 may be configured to display the real-time location of a plurality of portable units 26 and the base station 12. In another example, the web application 76 may be configured to issue reports. The reports issued by the web application 76 may include data such as location data on the portable units 26 or incident, alerts, or other data generated by the telematics system 10 or metrics about the telematics system 10. The web application 76 may also display the battery life of one or more of the portable units 26.

Optionally, the web application 76 is configured to allow a user to designate custom safety zones 50 within a worksite using the web application 76. Such safety zones 50 may, for example, be around safe aisles, toilets, dangerous chemicals, dangerous tools, fire, tornado shelters, or other objects or places around a worksite that could create a hazard if the place or object were involved in a collision or accident. Optionally, the web application is configured to allow a user to assign a particular portable unit 26 to a particular worker 28, lifting apparatus 38, or other structure or equipment 42 using the web application 76.

Methods of Use

Figure 7:
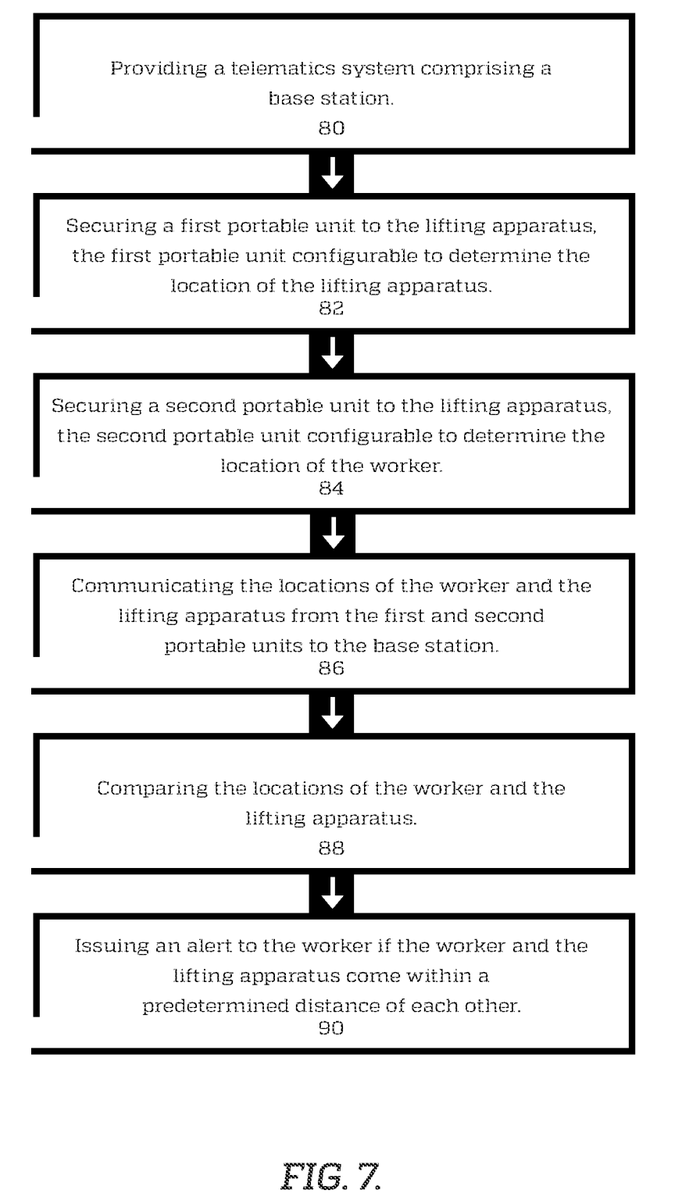
FIG. 7 is a flow chart showing various steps in an exemplary method in accordance with the present disclosure.

As shown in FIG. 7, the present disclosure provides a method of monitoring objects that may be used to prevent collisions or accidents from occurring between several monitored objects or persons. The method may comprise completing any of the following steps in any order including simultaneously. One step in a method of using the telematics system 10 may include providing at least one worker 28. Another step may comprise providing a lifting apparatus 38 comprising a load point 40. The lifting apparatus 38 may also be a fixed lifting apparatus 38 such as a tower crane or a mobile lifting apparatus 38 such as all-terrain crane. The load point 40 of the lifting apparatus 38 may be a hook block, spreader bar, or other device that is configured to secure a load. The load point 40 may also refer to the load itself. A structure or piece of equipment 42, for example, a tower pole, vehicle, fork truck, dump truck, or lift bucket, may be provided instead of either a lifting apparatus 38 or a worker 28 or in addition to a lifting apparatus 38 and a worker 28. As used herein, references to a piece of equipment 42 may include a lifting apparatus 38 unless specified otherwise.

Another step may include providing a telematics system 10 according to one embodiment of the present disclosure. Generally, the telematics system 10 comprises a plurality of portable units 26 and a base station 12 according to any of the embodiments or having any combination of features discussed above. For example, the base station 12 may comprise a position sensor 16 and a communication transceiver 18. The portable units 26 may comprise a position sensor 16, a communication transceiver 18, and any combination of other sensors discussed above. A portable unit 26 may be secured to a worker 28, lifting apparatus 38, piece of equipment 42, or other object on a work site.

Another step in the method may comprise adjusting the mode of the portable unit 26 to the mode corresponding to the object that the portable unit 26 is attached to. For example, one or more portable units 26 may be secured to a worker 28 and set to worker mode. The portable unit 26 secured to the worker 28 may generate location data for the worker 28 and transmit the location data for the worker 28 to the base station 12. When equipment 42 such as a worker's vehicle is monitored as part of the telematics system 10, one or more portable units 26 may be secured to the equipment 38 and set to equipment mode. The portable unit 26 secured to the equipment 38 may generate location data for the equipment 42 and may communicate the location data for the equipment 42 to the base station 12. Another portable unit 26 may be secured to the lifting apparatus 38 and may be set to lift mode. The portable unit 26 secured to the lifting apparatus 38 may then generate location data for the lifting apparatus 38 and communicate the location data for the lifting apparatus 38 to the base station 12.

When secured to a lifting apparatus 38, the portable unit 26 may be secured to the lifting apparatus 38 near or adjacent to the load point 40, base, rear 46, mast 48, cabin, counterweight, hoist, or other parts of the lifting apparatus 38 as shown in FIG. 5. FIGS. 5-6 show a number of portable units secured to lifting apparatus 38 and piece of equipment 42 for illustrative purposes. The telematics system 10 may be used with fewer portable units 26 secured to the lifting apparatus 38 or piece of equipment 42. The portable unit 26 secured to the lifting apparatus 38 may be within 3 meters of the load point 40. In some embodiments, the portable unit 26 secured to the lifting apparatus 38 is within 1 meter of the load point 40.

The portable units 26 may be communicably connected with the base station 12. Preferably, the connection between the portable units 26 and the base station 12 is a wireless connection. The portable units 26 may communicate the location of a monitored worker 28, lifting apparatus 38, or other equipment 42 to the base station 12.

The method may further include the step of compiling the location data transmitted from the portable units 26 to the base station 12. The base station 12 may compare the location of one portable unit 26 secured to a worker 28, lifting apparatus, 38, or other pieces of equipment 42 to the location of other portable units 26 secured to another worker 28, lifting apparatus, 38, or other pieces of equipment 42 to determine the distance between the objects.

As shown in FIGS. 5-6, the base station 12 may dynamically generate a safety zone 50 around the location of a portable unit 26 secured to a piece of equipment 42 or below the location of a portable unit 26 secured to the lifting apparatus 38. The safety zone 50 may also be generated such that the piece of equipment 42 or lifting apparatus 38 is not within the safety zone. For example, if the piece of equipment 42 is a vehicle, the safety zone 50 may be in front of or behind the vehicle. The safety zone 50 may be in the form of a circle having a preset radius configured before or during the use of the telematics system 10. In other embodiments, the safety zone 50 may be in the form of a custom shape. Optionally, the safety zone 50 below a load point 40 may increase in size as the elevation of the load point 40 increases, and the safety zone 50 below the load point 40 may decrease in size as the elevation of the load point 40 decreases. Among other things, this feature takes into account that falling objects may move laterally as they fall and may move further laterally if they fall over great distances. Thus, a larger safety zone may be appropriate below a higher load point 40.

The method may further comprise the step of issuing an alert to a worker 28 (e.g., generating an alarm) if a worker 28, a load point 40, a lifting apparatus 38, or equipment 42 come within a predetermined distance of each other (e.g., 0.25, 0.5, or 1 meters) or within the safety zone 50 around another object. The alert to the worker 28 may be in the form of an auditory, visual, or kinetic alert as discussed above. The predetermined distance or safety zone 50 may be configured before or during operation.

An operator 78 may operate the lifting apparatus 38 or other equipment 42. The method may further comprise alerting operators 78 of a lifting apparatus 38 or piece of equipment 42 if a worker 28, a lifting apparatus 38, a load point 40, or other pieces of equipment 42 come within a predetermined distance of each other or within a safety zone 50 around one of the objects. The operator may be alerted in the same instances where a worker 28 is alerted.

In further embodiments, the base station 12 may complete the step of monitoring the location of a worker 28, load point 40, lifting apparatus 38, or piece of equipment 42 over time and estimating a trajectory for the worker 28, load point 40, the lifting apparatus 38, or piece of equipment 42. The method may further comprise issuing an alert to a worker 28 or operator 78 of a lifting apparatus 38 or piece of equipment 42 if the worker 28 is determined to be on a path to enter the safety zone 50 around the load point 40, lifting apparatus 38, or piece of equipment 42. In some embodiments, a worker 28 may only be alerted if the load point 40, lifting apparatus 38, or piece of equipment 42 are determined to be on a path to enter a safety zone 50 within a designated time. For example, the telematics system 10 may not issue an alert if a worker 28 is on a trajectory to enter a safety zone 50 below a load point 40 in five minutes but may issue an alert if a worker 28 is on a trajectory to enter a safety zone 50 within ten seconds. A flow diagram illustrating exemplary operation of the method is included in FIG. 7 with steps 80, 82, 84, 86, 88, and 90 as indicated.

The telematics system 10 may be used to prevent collisions or accidents between different pieces of equipment 42 or lifting apparatuses 38. The method may comprise securing portable units 26 to different pieces of equipment 42 or lifting apparatuses 38, generating location data for the pieces of equipment 42 or lifting apparatuses 38, and communicating the location data for the pieces of equipment 42 or lifting apparatuses 38 to the base station 12. The method may further comprise comparing the locations of the pieces of equipment 42 or lifting apparatuses 38 to determine the distance between the pieces of equipment 42 or lifting apparatuses 38. As with other embodiments, a safety zone 50 may be dynamically generated around the pieces of equipment 42 or lifting apparatuses 38. The locations of the pieces of equipment 42 or lifting apparatuses 38 may also be monitored over time to estimate a trajectory for the pieces of equipment 42 or lifting apparatuses 38. An alert may be issued if the pieces of equipment 42 or lifting apparatuses 38 come within a predetermined distance of one another, come within the safety zone 50 around one another, or are on a trajectory to collide or enter the safety zone 50 around one another. The alert may be issued to operators 78 of the pieces of equipment 42 or lifting apparatuses 38, and, in some embodiments, to workers 28 in the vicinity of the pieces of equipment 42 or lifting apparatuses 38.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure.

The above description of preferred embodiments should not be interpreted in a limiting manner since other variations, modifications and refinements are possible within the spirit and scope of the present disclosure. The scope of the invention(s) is defined in the appended claims and their equivalents.

What is claimed is:

1. A method of monitoring objects in a space having a lifting apparatus and a worker, comprising the steps of:
   a) providing a telematics system comprising a base station configured to generate location correction data;
   b) securing a first portable unit to the lifting apparatus, the first portable unit configurable to allow the telematics system to determine the location of the lifting apparatus;
   c) securing a second portable unit to the worker, the second portable unit configurable to allow the telematics system to determine the location of the worker;
   d) communicating the location correction data to the portable units, calculating corrected locations of the worker and lifting apparatus, and communicating the corrected locations of the worker and the lifting apparatus from the first and second portable units to the base station;
   e) comparing the locations of the worker and the lifting apparatus; and
   f) issuing an alert to the worker if the worker and the lifting apparatus come within a predetermined distance of each other.

2. The method of claim 1, wherein the step of comparing the locations further comprises dynamically generating a safety zone around the location of the lifting apparatus and comparing the location of the worker and the safety zone around the lifting apparatus, and wherein the step of issuing an alert further comprises issuing an alert to the worker if the location of the worker is within the safety zone.

3. The method of claim 2, wherein the step of communicating the locations further comprises communicating the location of the worker and the lifting apparatus over time, wherein the step of comparing the locations further comprises estimating trajectories for the worker and the lifting apparatus and comparing the trajectories of the worker and the lifting apparatus, and wherein the step of issuing an alert further comprises issuing an alert to the worker if the worker is determined to be on a path to enter the safety zone around the lifting apparatus.

4. The method of claim 2, wherein the lifting apparatus comprises a load point, and wherein the step of securing the first portable unit to the lifting apparatus further comprises securing the first portable unit adjacent the load point of the lifting apparatus, and wherein the safety zone is around the load point of the lifting apparatus.

5. The method of claim 4, further comprising increasing the size of the safety zone as the elevation of the load point increases and decreasing the size of the safety zone as the elevation of the lifting apparatus decreases.

6. The method of claim 1, wherein the lifting apparatus further comprises an operator, and wherein the step of issuing an alert further comprises issuing an alert to the operator if the worker and lifting apparatus come within a predetermined distance of each other.

7. The method of claim 1, wherein the step of issuing an alert further comprises issuing an alert that is a visual, auditory, or kinetic alert.

8. A method of monitoring objects in a space having a piece of equipment and a worker, comprising the steps of:
   a) providing a telematics system comprising a base station;
   b) securing a first portable unit to the worker, the first portable unit configurable to allow the telematics system to determine the location of the worker;
   c) securing a second portable unit to the piece of equipment, the second portable unit configurable to allow the telematics system to determine a first location of the piece of equipment;
   d) securing a third portable unit to the piece of equipment at a different position than the second portable unit, the third portable unit configurable to determine a second location of the piece of equipment;
   e) communicating the location of the worker and the first and second location of the piece of equipment from the first, second, and third portable units to the base station;
   f) comparing the locations of the worker and the piece of equipment; and
   g) issuing an alert to the worker if the worker and the piece of equipment come within a predetermined distance of each other.

9. The method of claim 8, wherein the step of comparing the locations further comprises dynamically generating a safety zone around the location of the piece of equipment and comparing the location of the worker and the safety zone around the piece of equipment, and wherein the step of issuing an alert further comprises issuing an alert to the worker if the location of the worker is within the safety zone.

10. The method of claim 9, wherein the step of communicating the locations further comprises communicating the location of the worker and the piece of equipment over time, wherein the step of comparing the locations further comprises estimating trajectories for the worker and the piece of equipment and comparing the trajectories of the worker and the piece of equipment, and wherein the step of issuing an alert further comprises issuing an alert to the worker if the worker is determined to be on a path to enter the safety zone around the piece of equipment.

11. The method of claim 8, wherein the step of comparing the locations further comprises determining a vector between the two locations of the piece of equipment, dynamically generating a safety zone around the vector, comparing the location of the worker and the safety zone; and wherein the step of issuing an alert further comprises issuing an alert to the worker if the worker is within the safety zone.

12. The method of claim 8, wherein the step of comparing the locations further comprises determining a vector between the two locations of the piece of equipment, dynamically generating a safety zone in front of the vector, comparing the location of the worker and the safety zone; and wherein the step of issuing an alert further comprises issuing an alert to the worker if the worker is within the safety zone.

13. A telematics system for monitoring objects in a space having a piece of equipment and a worker, comprising:
   a base station comprising a position sensor for determining the location of the base station; and
   a plurality of portable units communicably connected to the base station, each portable unit comprising a position sensor,
   wherein a portable unit comprises an airtight ambient air chamber, a temperature sensor for measuring temperature data, a humidity sensor for measuring humidity data, a volatile organic compound sensor for detecting volatile organic compounds around the volatile organic compound sensor, and a microphone for recording audio data,
   wherein the temperature sensor, the humidity sensor, the volatile organic compound sensor, and the microphone are disposed in the airtight ambient air chamber,
   wherein a portable unit is configured to secure to the piece of equipment, to allow the telematics system to determine the location of the piece of equipment using the position sensor, and to transmit the location of the piece of equipment to the base station,
   wherein a portable unit is configured to secure to the worker, to allow the telematics system to determine the location of the worker using the position sensor, and to transmit the location of the worker to the base station;
   wherein the base station is configured to receive the locations of the piece of equipment and the worker, compare the piece of equipment and the worker, and issue an alert if the piece of equipment and the worker come within a predetermined distance of each other.

14. The telematics system of claim 13, wherein a portable unit further comprises an accelerometer for measuring the movement of the portable unit.

15. The telematics system of claim 13, wherein a portable unit further comprises a camera configured to take photos or videos at regular time intervals.

16. The telematics system of claim 13, wherein the base station and/or each portable unit comprises a digital storage medium.

* * * * *